United States Patent
Tran et al.

(10) Patent No.: US 12,294,876 B2
(45) Date of Patent: May 6, 2025

(54) LOCATION SIMULATION FOR WIRELESS DEVICES

(71) Applicant: T-Mobile USA, Inc., Bellevue, WA (US)

(72) Inventors: Antoine Tran, Bellevue, WA (US); Emile Tran, Sammamish, WA (US); Dennis Jarret Guill, Jr., Richardson, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 720 days.

(21) Appl. No.: 17/548,469

(22) Filed: Dec. 10, 2021

(65) Prior Publication Data

US 2023/0189024 A1    Jun. 15, 2023

(51) Int. Cl.
*H04W 24/06*    (2009.01)
*H04B 17/00*    (2015.01)
*H04W 4/029*    (2018.01)

(52) U.S. Cl.
CPC ........ *H04W 24/06* (2013.01); *H04B 17/0085* (2013.01); *H04W 4/029* (2018.02)

(58) Field of Classification Search
CPC ....... H04W 24/06; H04W 4/029; H04W 4/02; H04W 4/026; H04W 4/027; H04W 4/33; H04W 84/12; H04B 17/0085; H04B 17/27; H04B 17/3912; G01S 5/021; G01S 5/02585
See application file for complete search history.

(56) References Cited

U.S. PATENT DOCUMENTS

| | | |
|---|---|---|
| 5,565,634 A | 10/1996 | Graessle et al. |
| 6,148,194 A | 11/2000 | Kao et al. |
| 6,199,032 B1 | 3/2001 | Anderson |
| 6,473,034 B2 | 10/2002 | Lin et al. |
| 6,525,657 B1 | 2/2003 | Wojcik |
| 6,571,082 B1 | 5/2003 | Rahman et al. |
| 6,724,730 B1 | 4/2004 | Mlinarsky et al. |
| 6,728,545 B1 | 4/2004 | Belcea |

(Continued)

FOREIGN PATENT DOCUMENTS

| | | |
|---|---|---|
| CN | 106507471 A | 3/2017 |
| CN | 107852200 A | 3/2018 |

(Continued)

*Primary Examiner* — Rina C Pancholi
(74) *Attorney, Agent, or Firm* — Perkins Coie LLP

(57) ABSTRACT

A method for determining a reliability of a wireless device to estimate its location under a simulated environmental condition includes simulating an environmental condition inside a test chamber by controlling a physical parameter. The test chamber contains the wireless user device configured to estimate a location of the wireless user device based on reference signals received from a signal source. The method includes communicating a pattern of reference signals having varying signal propagation characteristics in the test chamber. The method includes receiving an indication of an estimated location calculated by the wireless user device based on the pattern of reference signals. The reliability of the wireless device to estimate its location under the simulated environmental condition is determined based on a comparison of the estimated location with the simulated location.

19 Claims, 7 Drawing Sheets

(56) References Cited

U.S. PATENT DOCUMENTS

| | | |
|---|---|---|
| 6,735,523 B1 | 5/2004 | Lin et al. |
| 7,162,367 B2 | 1/2007 | Lin et al. |
| 7,313,402 B1 | 12/2007 | Rahman |
| 7,359,718 B2 | 4/2008 | Tao et al. |
| 7,539,489 B1 | 5/2009 | Alexander |
| 7,711,375 B2 | 5/2010 | Liu |
| 7,797,132 B1 | 9/2010 | Lele et al. |
| 7,826,969 B2 | 11/2010 | Hein et al. |
| 7,890,821 B2 | 2/2011 | Music et al. |
| 7,940,740 B2 | 5/2011 | Krishnamurthy et al. |
| 7,958,488 B2 | 6/2011 | Cifra |
| 8,077,090 B1 | 12/2011 | Chintalapudi et al. |
| 8,126,425 B2 | 2/2012 | Hansen et al. |
| 8,213,978 B1 | 7/2012 | Ho et al. |
| 8,326,319 B2 | 12/2012 | Davis |
| 8,331,869 B2 | 12/2012 | Foegelle |
| 8,385,911 B1 | 2/2013 | Vallette |
| 8,521,092 B2 | 8/2013 | Kennedy et al. |
| 8,638,671 B2 | 1/2014 | Finlow-bates et al. |
| 8,792,908 B2 | 7/2014 | Youssef et al. |
| 8,854,260 B2 | 10/2014 | Boulton |
| 8,922,430 B2 | 12/2014 | Gander et al. |
| 8,938,255 B2 | 1/2015 | Tsruya et al. |
| 8,942,109 B2 | 1/2015 | Dorenbosch et al. |
| 8,977,292 B2 | 3/2015 | Shu et al. |
| 9,069,749 B1 | 6/2015 | Rumsby et al. |
| 9,276,393 B2 | 3/2016 | Ostrovsky |
| 9,288,696 B2 | 3/2016 | Szini et al. |
| 9,369,987 B2 | 6/2016 | Wang et al. |
| 9,386,469 B2 | 7/2016 | Siomina et al. |
| 9,515,378 B2 | 12/2016 | Prasad |
| 9,551,781 B2 | 1/2017 | Baxley et al. |
| 9,642,110 B2 | 5/2017 | Liu et al. |
| 9,660,739 B2 | 5/2017 | Reed |
| 9,699,674 B2 | 7/2017 | Khurana et al. |
| 9,730,080 B2 | 8/2017 | Wang et al. |
| 9,749,063 B2 | 8/2017 | Massarella et al. |
| 9,749,786 B1 | 8/2017 | Pandey et al. |
| 9,749,801 B2 | 8/2017 | Liu et al. |
| 9,781,609 B1 | 10/2017 | Kurtz et al. |
| 9,838,994 B1 | 12/2017 | Lee et al. |
| 9,924,388 B2 | 3/2018 | Zhang et al. |
| 9,942,719 B2 | 4/2018 | Bitra et al. |
| 9,955,309 B2 | 4/2018 | Wirola |
| 9,992,690 B2 | 6/2018 | Butchko et al. |
| 10,055,525 B2 | 8/2018 | Slutzky et al. |
| 10,168,695 B2 | 1/2019 | Barnickel et al. |
| 10,180,488 B2 | 1/2019 | Wirola et al. |
| 10,244,411 B2 | 3/2019 | Reed |
| 10,264,425 B2 | 4/2019 | De Azevedo et al. |
| 10,264,467 B2 | 4/2019 | Barnickel et al. |
| 10,433,195 B2 | 10/2019 | Khurana et al. |
| 10,473,749 B1 | 11/2019 | Baxley et al. |
| 10,484,882 B2 | 11/2019 | Torsner et al. |
| 10,645,593 B2 | 5/2020 | Barmettler et al. |
| 10,674,374 B2 | 6/2020 | Hasan et al. |
| 10,684,318 B1 | 6/2020 | Kyrolainen et al. |
| 10,701,531 B2 | 6/2020 | Agrawal et al. |
| 10,845,453 B2 | 11/2020 | Markhovsky et al. |
| 10,866,323 B2 | 12/2020 | Kallankari et al. |
| 10,880,020 B2 | 12/2020 | Ioffe |
| 10,935,584 B2 | 3/2021 | Kong et al. |
| 2004/0203904 A1* | 10/2004 | Gwon ............... H04W 64/00 455/457 |
| 2006/0019679 A1 | 1/2006 | Rappaport et al. |
| 2006/0287824 A1 | 12/2006 | Lin |
| 2010/0296409 A1 | 11/2010 | Fok et al. |
| 2011/0066416 A1 | 3/2011 | Sachs |
| 2011/0286349 A1* | 11/2011 | Tee ............... H04W 56/0045 370/252 |
| 2012/0154228 A1 | 6/2012 | Stoufer et al. |
| 2012/0176907 A1 | 7/2012 | Hartenstein et al. |
| 2013/0023285 A1 | 1/2013 | Markhovsky et al. |
| 2013/0041648 A1 | 2/2013 | Osman et al. |
| 2013/0178235 A1* | 7/2013 | Chen ............... G01S 5/12 455/456.5 |
| 2013/0265893 A1 | 10/2013 | Choi et al. |
| 2014/0225773 A1 | 8/2014 | Boulton |
| 2016/0375346 A1 | 12/2016 | Czaja et al. |
| 2017/0059687 A1 | 3/2017 | Dinesh et al. |
| 2017/0242129 A1* | 8/2017 | Kallankari ...... G01R 29/0821 |
| 2018/0062971 A1* | 3/2018 | Kyosti ............... H04L 43/50 |
| 2018/0106618 A1* | 4/2018 | Cerchio ............ H04W 4/80 |
| 2019/0215707 A1 | 7/2019 | Jackson |
| 2020/0007200 A1 | 1/2020 | Schreck et al. |
| 2020/0191848 A1 | 6/2020 | Grossmann et al. |
| 2020/0333434 A1 | 10/2020 | Chancey et al. |
| 2021/0067257 A1* | 3/2021 | Lin ............... H04B 17/16 |
| 2021/0243713 A1 | 8/2021 | Ellenbeck et al. |

FOREIGN PATENT DOCUMENTS

| | | |
|---|---|---|
| CN | 108174343 A | 6/2018 |
| CN | 105468833 B | 9/2018 |
| CN | 105207726 B | 11/2018 |
| CN | 106773783 B | 4/2020 |
| CN | 107809289 B | 8/2021 |
| DE | 102018213744 A1 | 2/2019 |
| EP | 1481560 A2 | 12/2004 |
| EP | 1595192 A2 | 11/2005 |
| EP | 2635997 A2 | 9/2013 |
| EP | 2758745 A1 | 7/2014 |
| EP | 2829134 A1 | 1/2015 |
| EP | 2997678 A1 | 3/2016 |
| EP | 2904721 B1 | 12/2016 |
| EP | 3348009 A1 | 7/2018 |
| EP | 3427495 A1 | 1/2019 |
| EP | 3759510 A1 | 1/2021 |
| EP | 3841358 A1 | 6/2021 |
| EP | 3857252 A1 | 8/2021 |
| JP | 5642102 B2 | 11/2014 |
| JP | 2016509801 A | 3/2016 |
| JP | 5920481 B2 | 4/2016 |
| JP | 5961108 B2 | 7/2016 |
| JP | 6001102 B2 | 9/2016 |
| KR | 20060023246 A | 3/2006 |
| KR | 100641330 B1 | 10/2006 |
| KR | 20100035916 A | 4/2010 |
| KR | 20100071428 A | 6/2010 |
| KR | 20110019693 A | 2/2011 |
| KR | 101049725 B1 | 7/2011 |
| KR | 101060998 B1 | 8/2011 |
| KR | 101532324 B1 | 6/2015 |
| KR | 20150118710 A | 10/2015 |
| KR | 20170078116 A | 7/2017 |
| KR | 101770136 B1 | 9/2017 |
| KR | 101956438 B1 | 3/2019 |
| KR | 102090087 B1 | 3/2020 |
| KR | 20210100293 A | 8/2021 |
| WO | 0126335 A2 | 4/2001 |
| WO | 2005062066 A2 | 7/2005 |
| WO | 2008144244 A2 | 11/2008 |
| WO | 2009009820 A1 | 1/2009 |
| WO | 2011094989 A1 | 8/2011 |
| WO | 2012143936 A1 | 10/2012 |
| WO | 2012143952 A2 | 10/2012 |
| WO | 2013185697 A1 | 12/2013 |
| WO | 2015079114 A1 | 6/2015 |
| WO | 2015155411 A1 | 10/2015 |
| WO | 2019154518 A1 | 8/2019 |
| WO | 2020163357 A1 | 8/2020 |
| WO | WO-2020165976 A1 * | 8/2020 ............ G06T 15/06 |
| WO | 2020212404 A1 | 10/2020 |
| WO | 2021056123 A1 | 4/2021 |
| WO | 2021062390 A2 | 4/2021 |
| WO | 2021116831 A1 | 6/2021 |
| WO | 2021141700 A1 | 7/2021 |
| WO | 2021167647 A1 | 8/2021 |

* cited by examiner

LOCATION SIMULATION FOR WIRELESS DEVICES

BACKGROUND

Tracking of a wireless device (e.g., a mobile phone) is a process for identifying a location of the wireless device. The wireless device may be stationary or moving during the process. Tracking may be enabled by a number of technologies, such as multilateration (e.g., triangulation) of radio signals between multiple signal sources (e.g. cell towers of a network or Wi-Fi access points) and the phone or by using the Global Positioning System (GPS). Multilateration determines a position based on the measurement of the times of flight (TOFs) of energy waves (radio, acoustic, seismic, etc.) having a known waveform and speed when propagating either from or to the stations. Additionally, multilateration may use measurements on dissipation or absorption of energy of reference signals to determine the position. The stations are at known locations and have synchronized clocks. Triangulation determines a position of the wireless device based on distances or absolute measurements of the time-of-flight of signals received by the wireless device from three or more cellular stations. Similar techniques can be applied to determine the position of the wireless device indoors based on signals from radio frequency (RF) beacons and Wireless-Fidelity (Wi-Fi) media access control (MAC) points.

Tracking may be used for location-based services that disclose the actual coordinates of a mobile phone. For example, telecommunication companies use tracking of wireless devices to approximate the location of a mobile phone, and thereby also its user. Such a feature is useful, for example, for using map applications. Furthermore, accurate and reliable tracking of wireless devices is important for emergency uses.

BRIEF DESCRIPTION OF THE DRAWINGS

Detailed descriptions of implementations of the present invention will be described and explained through the use of the accompanying drawings.

Figure 1:
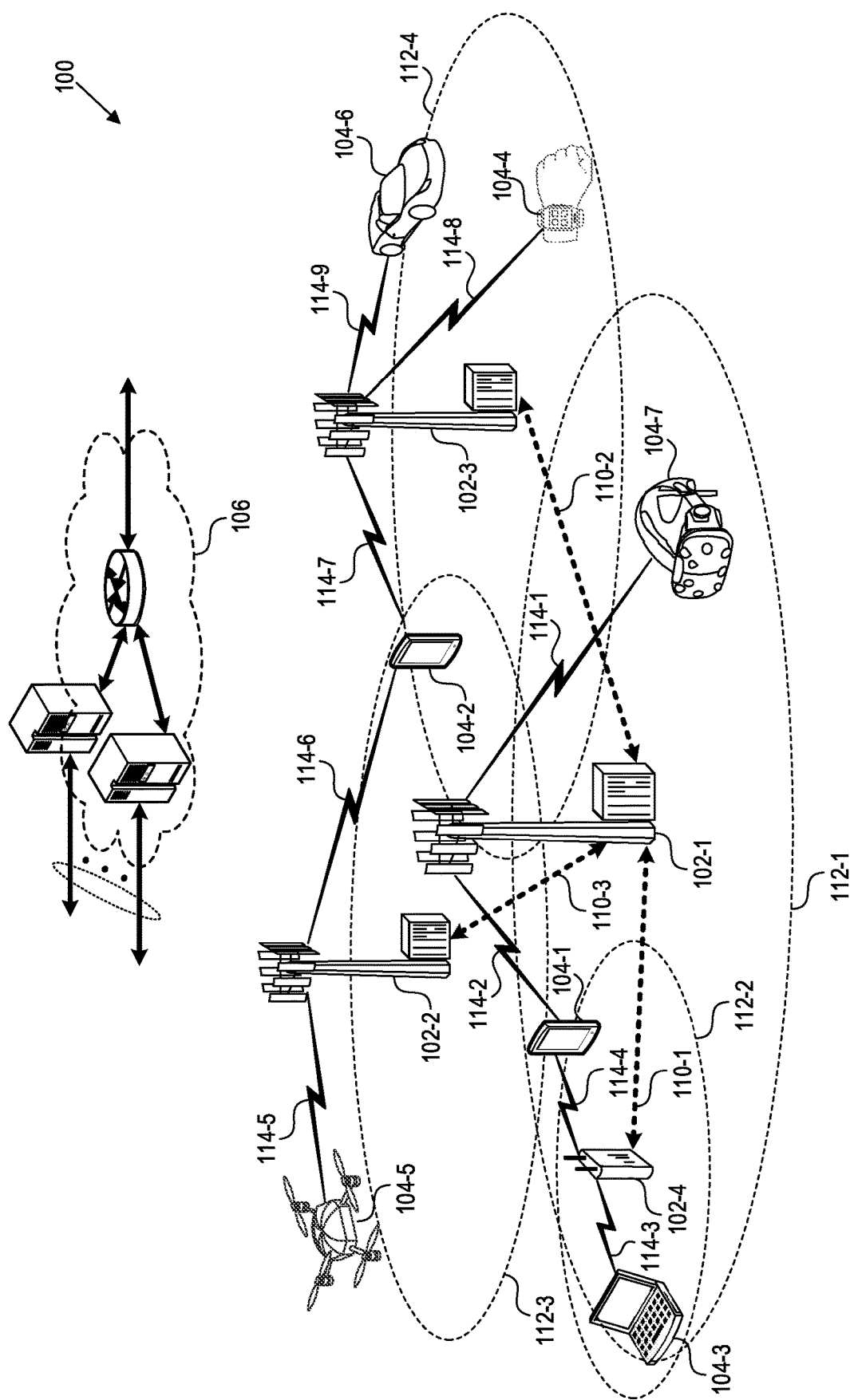
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to location simulator systems for determining a reliability of a wireless device (e.g., a mobile phone) to determine its location under different environmental conditions. The location simulator system simulates an environment inside a test chamber by controlling one or more physical parameters. The location simulator also communicates a pattern of reference signals in the test chamber (e.g. to simulate a time-of-flight or a dispersion of energy for the signals). The wireless device is positioned inside the test chamber. The wireless device is configured to measure the conditions as simulated inside the test chamber. The reliability of the wireless device to estimates its location is determined by comparing the difference between the position estimated by the wireless device and the position as emulated in the simulation chamber. For example, the simulator system compares the estimated location and the simulated location to determine the reliability of the wireless device for determining its location under the simulated environmental conditions. The reliability of the wireless device to determine its location refers to the device's ability to estimate its location consistently and accurately under different environmental conditions. The reliability can depend on the device's capabilities such as capabilities of the sensors and detectors and/or software algorithms.

In one example, a testing system simulates an environmental condition inside the test chamber while the wireless device is positioned inside the test chamber. The environmental condition is simulated by controlling a physical parameter including magnetic field, temperature, atmospheric pressure, light, sound, motion, or visualization. The testing system then communicates a pattern of reference signals in the test chamber by a signal generator. The signal generator is configured to vary one or more signal propagation characteristics (e.g., strength, direction, pattern, latency and/or propagation of the signals) to simulate the conditions at the simulated position. The pattern of signals with the varying propagation characteristics simulate signals (e.g., GPS Positioning System (GPS) signals, Wi-Fi signals, cellular signals, and radio frequency (RF) signals) originating from different reference positions (e.g., beacons, satellites, masts, access points) to the simulated position that the wireless device would be comparing its position determination against. The testing system receives an estimated location calculated by the wireless device based on the signals. The testing system then compares the location estimated by the wireless device and the simulated location to determine the ability of the wireless device to reliably determine its location under the simulated environmental condition.

In another example, a testing system includes a test chamber, control elements, and a signal generator. The control elements are coupled with the test chamber and are configured to control the environmental condition inside the test chamber. In particular, the control elements regulate the one or more physical parameters (e.g., the magnetic field, temperature, atmospheric pressure, light, sound, motion, or visualization). The signal generator (e.g., an RF path simulator) is also coupled with the test chamber. The signal generator generates the signals with varying propagation characteristics that the wireless device uses for determining its location.

In yet another example, a wireless device is configured to actively produce reference signals and determine its location inside a test chamber based on the reference signals. In such an instance, the wireless device both generates and receives reference signals for determining its location when the wireless device is positioned inside the test chamber having a simulated environment condition. The wireless device generates a reference signal (e.g., an optical signal, a radio signal, or a sound signal). The test chamber is configured to: 1) measure the reference signal generated by the wireless device, 2) absorb the reference signal, and 3) generate a simulated signal to mimic time-of-flight or power loss of a reflection of the reference signal from a target situated beyond the wall of the chamber. The wireless device is further configured to determine values for the one or more physical parameters when it is positioned inside the test chamber. For example, the wireless device includes one or more sensors for measuring a magnetic field, temperature, atmospheric pressure, light, sound, motion, or visualization. The wireless device is also configured to estimate its location based on propagation characteristics my measuring the simulated reflected signal and estimating its position based on the simulated reflected signal and the determined values for the one or more physical parameters. The estimated location can be used for determining a reliability of the wireless device to determine its location under the simulated environmental condition by comparing the estimated location against the simulated position.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptop devices 104-3; wearable devices 104-4; drones 104-5; vehicles with wireless connectivity 104-6; head-mounted displays 104-7 with wireless augmented reality/virtual reality (AR/VR) connectivity; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Location Simulator Systems

Figure 2:
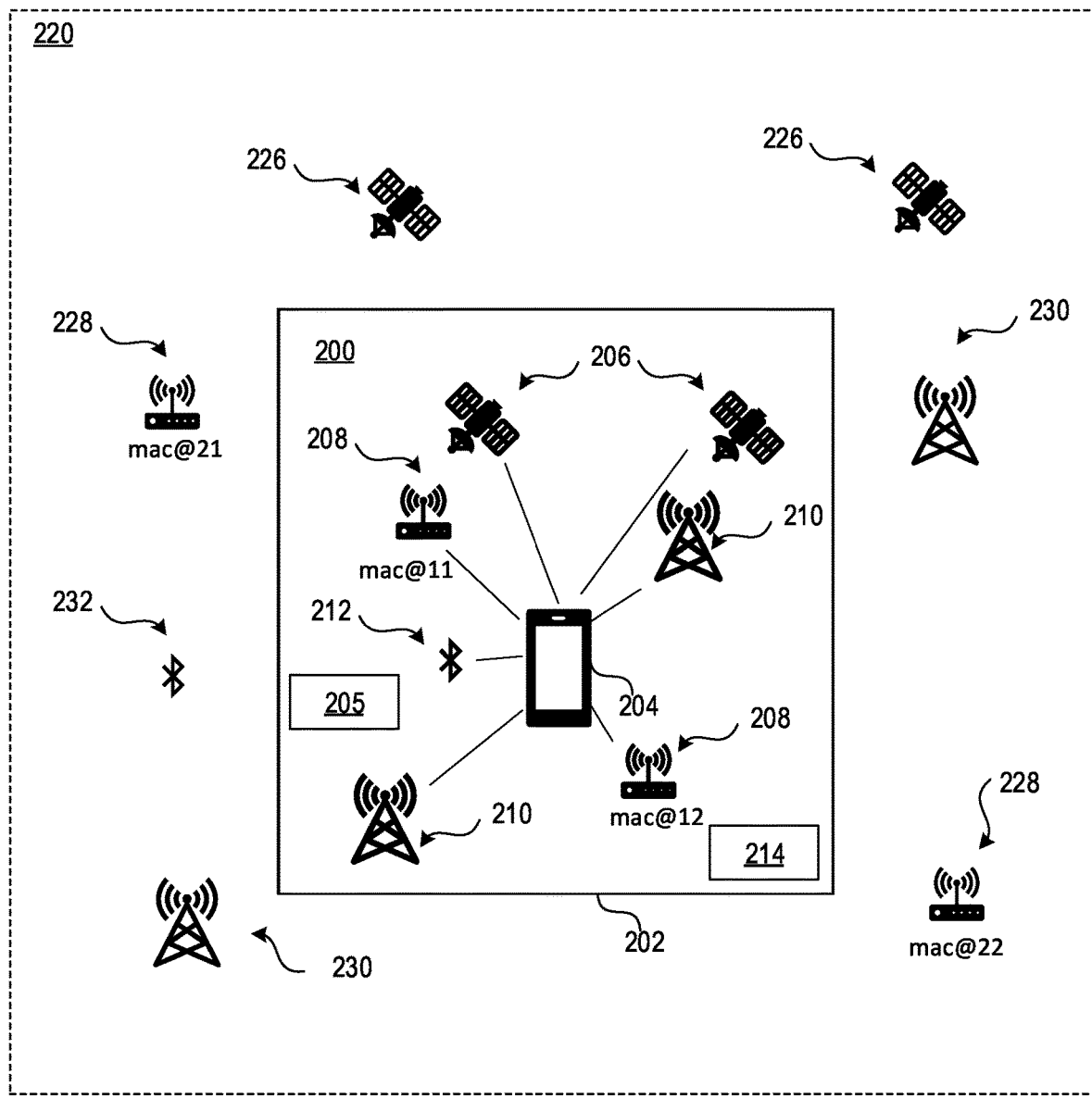
FIG. 2 is a block diagram that illustrates a testing system in which aspects of the disclosed technology are incorporated.

FIG. 2 is a block diagram that illustrates a testing system 200 ("system 200) in which aspects of the disclosed technology are incorporated. The system 200 includes a test chamber 202, one or more physical parameter control elements 214 ("control elements 214"), and one or more signal generators 205. In the illustrated example, a wireless device 204 (also referred to as a wireless user device) is positioned inside the test chamber 202 of the system 200. The wireless device can couple to the system 200.

The one or more signal generators 205 are configured to simulate wireless signals with characteristics corresponding to different types of signal sources. For example, the one or more signal generators 205 can simulate signals having characteristics associated with Global Positioning Service (GPS) signal sources (e.g., GPS satellites 206), cellular signal sources (e.g., cellular masts 210), Wireless-Fidelity (Wi-Fi) access points (e.g., Wi-Fi access points 208), or radio-frequency (RF) source (e.g., RF source 212 such as a Bluetooth source). The one or more control elements 214 are configured to control physical parameters inside the test chamber 202. The simulated environment may be an indoor environment or an outdoor environment. The control elements 214 may include one or more control elements for controlling temperature, humidity, atmospheric pressure, light level, magnetic field, and/or sound inside the test chamber 202. The control elements 214 may further include one or more control elements that simulate movement and/or visual environment for the wireless device 204 inside the test chamber 202. The control elements 214 further include a proximity sensor for detecting a proximity of the wireless device to other object (e.g., to simulate that the wireless device 204 is inside a user's bag or a pocket or the user is holding the wireless device in his hand).

As an example, the system 200 in FIG. 2 is configured to simulate physical parameters as well as a wireless signaling environment corresponding to a real-world environment 220. The control elements 214 simulate the physical parameters associated with the real-world environment 220. The one or more signal generators of the system 200 simulate reference signals in the real-world environment 220. As illustrated, GPS satellites 206 represent sources of signals that simulate real-world reference signals from GPS satellites 226, cellular masts 210 represent sources of signals that simulate real-world reference signals from cellular masts 230, Wi-Fi access points 208 represent sources of signals that simulate real-world reference signals from Wi-Fi access points 228, and RF source 212 represents a source of signals that simulates real-world reference signals from RF source 212.

The system 200 is thereby configured to simulate different types of environments where the wireless device 204 could be positioned in the real-world, and determine the reliability (e.g., effectiveness, accuracy) of the wireless device to determine its location under such a simulated environment. For example, a result of a reliability test can include a determination that the wireless device was able to accurately detect its location in the simulated environment within 1 meter, 5 meters, 10 meters, 25 meters, etc. The result can further include that the wireless device was able to detect its location with a first accuracy in a vertical direction and with a second accuracy in a horizontal direction. In some implementations, the ability of the wireless device 204 to reliably determine its location is further compared to a predefined threshold value (e.g., a predefined threshold value set by manufacturers or by government standards). Thus, the system 200 provides a convenient, efficient, and cost-effective means for estimating the reliability of location tracking compared to experiments performed in a real-world environment (e.g., testing performed in the field). The system 200 further ensures consistent test conditions for estimating the reliability of location tracking.

Figure 3A:
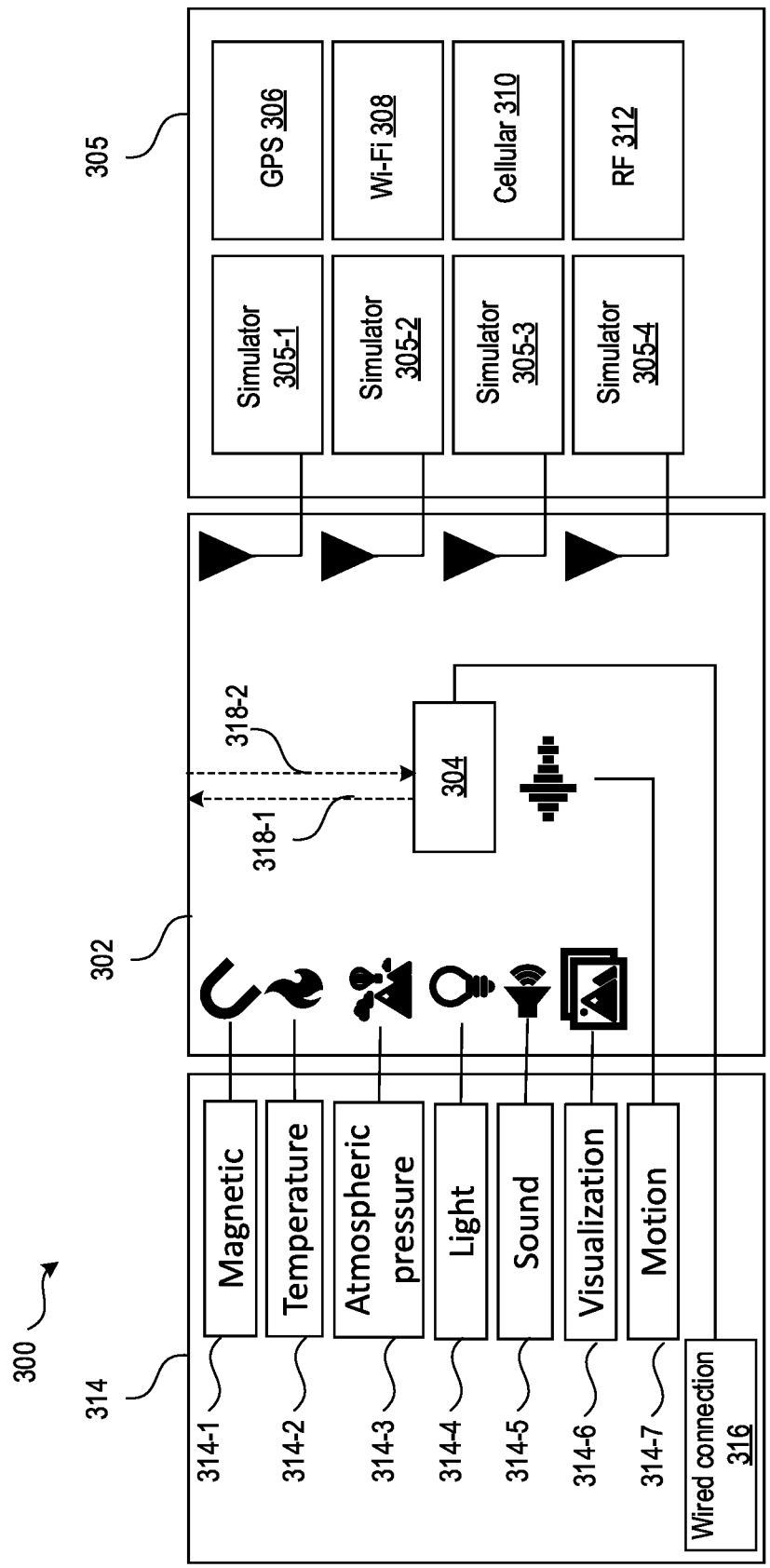
FIG. 3A is a block diagram that illustrates a testing system in which at least some operations described herein can be implemented.

FIG. 3A is a block diagram that illustrates a testing system 300 in which at least some operations described herein can be implemented. In some implementations, the testing system 300 corresponds to the testing system 200 described above with respect to FIG. 2. The testing system 300 includes a test chamber 302, control elements 314 (e.g., control elements 314-1 through 314-7), and one or more signal generators 305 (e.g., signal generators 305-1 through 305-4). The testing system 300 can determine the ability of a wireless device (e.g., a wireless device 304) to reliably estimate a location under a simulated environmental condition and based on a pattern of reference signals.

As shown, the wireless device 304 is positioned inside the test chamber 302. The wireless device 304 can correspond to any of the wireless devices 104 described with respect to FIG. 1. For example, the wireless device 304 can correspond to the mobile device 104-1 or 104-2 (e.g., a smartphone, tablet, portable hotspot, etc.); the laptop computer 104-3; a wearable device 104-4 such as a smartwatch; a drone 104-5; a vehicle with wireless connectivity 104-6 or a vehicle tracking device; a head-mounted display 104-7 with wireless augmented reality/virtual reality (AR/VR) connectivity; portable gaming consoles; and other fixed-wireless access devices; wirelessly connected sensors that provide data to a remote server over a network; IoT devices such as wirelessly connected smart home appliances, or any other wireless device that is configured to estimate its location.

The wireless device 304 includes a tracking system for estimating a geographical, physical, and/or spatial location of the wireless device. The tracking system is configured to estimate the location of the wireless device 304 based on environmental conditions surrounding the wireless device 304 as well as based on received signals (e.g., cellular, RF, GPS, or Wi-Fi signals). The tracking system may include multiple tracking sensors or detectors that detect physical parameters of the environment surrounding the wireless device 304. The sensors can be selected from a magnetometer, a thermometer, a sound detector, a light sensor, and an atmospheric pressure sensor. A magnetometer can detect magnetic field surrounding the wireless device 304 thereby operating as a digital compass. The thermometer can detect the temperature of the surrounding environment. The sound detector can detect sounds in the environment surrounding the wireless device 304. In some implementations, the sound detector can also identify different sounds. For example, the sound detector separates background noise from specific sound features, or identifies certain sounds such as wind, waves, car engine, animal sounds, speech, or music. As another example, the sound detector identifies speech (e.g., by using natural language recognition techniques). As yet another example, the sound detector detects sound absorption characteristics of the surrounding environment. The sound absorption characteristics may be used for estimating a size of a room (e.g., based on a detected echo) or estimating that the surrounding environment is outdoors (e.g., no echo detected). The light detector can detect lights surrounding the wireless device 304. In some implementations, the light detector can identify wavelengths, intensity, and/or intensity variation frequency of the surrounding light. For example, the light detector can identify whether the surrounding light includes wavelength ranges associated with outdoor light or wavelength ranges associated with indoor light. As another example, the light detector can identify whether the intensity variation frequency of the surrounding light corresponds to indoor light. The atmospheric pressure sensor can detect the atmospheric pressure surrounding the wireless device 304. For example, the atmospheric pressure can be used to identify whether the wireless device 304 is located indoors or outdoors, inside a vehicle, on top of a hill or in a valley, or on a top floor or a ground floor of a building, etc.

The sensors (or detectors) can include sensors for detecting movement of the wireless device 304. Such sensors can include an accelerometer (for linear movement) or a gyroscope (for rotational movement). The sensors can also include sensors for detecting a visual environment of the wireless device 304, such as a camera that can capture images or videos of the surrounding environment. In some implementations, the images or videos are used for determining (e.g., by image recognition techniques) whether the wireless device 304 is located in an indoor environment or an outdoor environment or whether the wireless device is moving or stationary. The images or videos can also be used to identify objects surrounding the wireless device 304. In one example, the images or videos are used to identify whether the wireless device is surrounded by buildings, trees, animals, humans, vehicles, etc.

The wireless device 304 further includes receivers for receiving wireless signals and optionally transmitters for sending wireless signals. The wireless signals may include GPS signals, RF signals (e.g., Bluetooth signals), Wi-Fi signals, cellular signals, etc. In some implementations, the wireless device 304 is configured to detect its location passively so that the wireless device 304 receives a pattern of signals from signal sources (e.g., the signal generators 305) and estimates its location based on the pattern of signals. The pattern of signals includes signals with different signal characteristics. The signal characteristics include characteristics associated with one or more of the GPS signals, RF signals, Wi-Fi signals, and cellular signals. The signal characteristics can include signal propagation, signal strength, and/or flight time latency. In one example, the wireless device 304 is configured to receive a pattern of signals including cellular signals. The pattern of signals includes signals having different flight time latency or strength thereby resembling signals originating from signal sources located at different distances from the wireless device 304. The wireless device 304 may determine its distance to the signal sources located at different distances and determine its location by comparing the different distances.

In some implementations, the wireless device 304 is configured to detect its location actively so that the wireless device 304 transmits a pattern of signals (e.g., signals 318-1). The pattern of signals can be received and absorbed by walls the test chamber 302. The test chamber 302 can also measure characteristics of the pattern of signals. The characteristics may include signal power, directions, and propagation properties such as time-of-flight. The test chamber 302 can then generate, in accordance with the measured characteristics, a simulated pattern of signals (e.g., signals 318-2) that simulate reflections of the signals transmitted by the wireless device off of objects that are situated at different distances that are beyond the walls of the test chamber 302. For example, the signals 318-2 simulate reflections of the signals 318-1 off of objects that are at different distances from the wireless device 304. The signals 318-2 can mimic reflections off of walls of a room to simulate an instance where the wireless device 304 is positioned inside the room in a real-world environment. The pattern of signals can include optical signals, radio signals, or sound signals (e.g., light detection and ranging (LIDAR) signals or ultrasounds signals). The wireless device 304 can determine its location based on the simulated pattern of signals (e.g., signals 318-2), for example, based on the flight of time or power of the signals.

In some implementations, the wireless device 304 is replaced by a test probe. The test probe can include all or some of the detectors, sensors, wireless signal transmitters, or wireless signal receivers included in the wireless device 304. The test probe can be configured to perform at least some of the sensing and detecting operations of the wireless device 304, as described above. The test probe can include, or be in communication with, a computer device (e.g., as described below with respect to FIG. 6) for operating the test probe and/or determining its location based on the wireless signals.

In some implementations, the test probe provides for a more convenient and cost-efficient way of testing a variety of sensing and detecting features.

The test chamber 302 is configured to provide for a controlled and adjustable environment for testing the location tracking properties of the wireless device 304. In one example, the test chamber 302 is insulated from its surrounding environment so that the surrounding physical parameters (e.g., magnetic field, temperature, pressure, sounds) or wireless signals do not interfere with the controlled environment inside the chamber. The test chamber 302 can be an anechoic chamber configured to absorb reflections sound and electromagnetic waves. The test chamber 302 can be an RF anechoic chamber configured to absorb different types of wireless signals (e.g., RF, Wi-Fi, GPS, and cellular signals). As shown, the test chamber 302 is coupled to multiple control elements 314 for simulating the physical conditions inside the chamber. The test chamber 302 is also coupled to one or more signal generators 305 for providing patterns of reference signals within the chamber.

The control elements 314 include a magnetic element 314-1, a temperature element 314-2, an atmospheric pressure element 314-3, a light element 314-4, a sound element 314-5, a visualization element 314-6, and a motion element 314-7. The magnetic element 314-1 is for generating a magnetic field inside the test chamber 302. The temperature element 314-2 is for setting a temperature inside the test chamber 302. The atmospheric pressure element 314-3 is for setting a pressure inside the test chamber 302. The light element 314-4 is for providing light inside the test chamber 302. The light element 314-4 can include one or more light sources positioned at different positions inside the test chamber 302. The light element 314-4 may include light sources configured to provide different wavelength ranges of light such as light resembling outdoor or light resembling indoor light. The sound element 314-5 is for providing sounds inside the test chamber 302. The sounds may include any type of sound simulating the environment surrounding the wireless device 304 in a real-world situation. The sounds can include background noise (e.g., white noise or echoing), the sound of vehicles, sound of wind, rain, waves, speech, animal sounds, music, etc. The visualization element 314-6 is for providing images or videos of a surrounding environment. The visualization element 314-6 may provide a stationary image of an environment surrounding the wireless device 304 and/or a video depicting the environment of a moving object. In one example, the visualization element 314-6 projects an image depicting a home environment inside the chamber 302. As another example, the visualization element 314-6 projects a video depicting a moving environment while a person is driving a car or walking. Alternatively, the visualization element 314-6 may feed the wireless device 304 electronic image or video signals or transmit electronic image or video files to the wireless device 304 data stream by software. In such instances, the camera of the wireless device 304 may be disabled. The motion element 314-7 can provide information associated with simulated movement. The information can include accelerometer values corresponding to a linearly moving object and/or gyroscopic values corresponding to a rotating object. In some implementations, the information associated with the simulated movement is used for estimating the simulated location by dead reckoning. Dead reckoning refers a method of calculating a current location based on a previously determined location incorporated by estimates of velocity, direction, and elapsed time. The control elements 314 can be configured to provide respective physical parameters in a constant manner (e.g., a constant pressure or constant magnetic field) or in a changing manner (e.g., a changing pressure or changing magnetic field).

Similarly to as described above with respect to the visualization element 314-6, in some implementations the control elements 314 do not physically control the environmental conditions inside the test chamber 302 but the system 300 is instead configured to transmit corresponding simulation data (e.g., electronic signals) to the wireless device 304. For example, instead of adjusting the temperature of the test chamber to be at a particular temperature, the system 300 is configured to transmit an electronic signal to the wireless device 304 that causes the wireless device 304 to determine that the surrounding temperature is at the particular temperature. In such implementations, the sensors and detectors of the wireless device 304 configured to measure the physical parameters of the surrounding environment can be disabled or disconnected.

In one example, the system 300 simulates an environment replicating a beach on a sunny hot day. In such an instance, the light element 314-4 provides light corresponding to outdoor light, the sound element 314-5 provides sounds of waves, the atmospheric pressure element 314-3 provides a pressure corresponding to the atmospheric pressure at the sea level, the temperature element 314-2 sets the temperature inside the test chamber 302 to correspond to a hot day (e.g., 85 degrees Fahrenheit), etc. As another example, the system 300 simulates an environment replicating an environment inside a moving elevator. The visualization element 314-6 provides an image depicting the inside of an elevator, the atmospheric pressure element 314-3 provides a changing pressure corresponding to an elevator moving from the bottom of the building toward the top of the building, the sound element 314-5 provides sounds replicating the sounds associated with a moving elevator, etc.

The one or more signal generators 305 are configured to generate and transmit wireless signals (e.g., a pattern of signals) inside the test chamber 302. The generated signals have varying signal propagation characteristics that simulate different types of reference signals received from different types of signal sources located at different locations. The signals are configured for simulating signals that the wireless device 304 can use to determine its location in a real-world environment. In some implementations, the signal generators 305 include RF path simulators. An RF path simulator includes a system controller for processing data, a data sequencer configured to interact with attenuators and RF emitters to simulate different RF propagation paths. Such RF path simulator is capable of replicating the real-world propagation of wireless signals.

The system 300 includes signal generators 305-1 through 305-4. Each of the signal simulators is configured to generate reference signals having distinct characteristics so that the signal generator 305-1 simulates signals with GPS signal characteristics (e.g., GPS signals 306), the signal generator 305-2 simulates signals with Wi-Fi characteristics (e.g., Wi-Fi signals 308), the signal generator 305-3 simulates signals with cellular signal characteristics (e.g., cellular signals 310), and the signal generator 305-4 simulates signals with RF signal characteristics (e.g., RF signals 312 such as Bluetooth signals). Alternatively, a single signal generator can be configured to provide signals with a combination of characteristics (e.g., a combination of two or more of the GPS signals, Wi-Fi signals, cellular signals, and RF signals). The signal generators 305 are configured to generate the signals transmitted from specific directions relative to the wireless device 304\*with specific frequency shifts, strengths and flight time latencies (e.g., as described in further detail with respect to FIG. 3B). The signals may be transmitted in/from multiple directions and be configured to replicate the real-world propagation of reference signals transmitted from different locations. Furthermore, the signals may include features that enable identification of the reference point transmitting the respective signals. For example, an identity of a wireless beacon can be identified based on the simulated signals. The identity may be further used for identifying the accurate location of the wireless beacon.

In some implementations, the test chamber 302 is further coupled with a wired connection access point 316. The wireless device 304 can use the physical location of the wired connection access point 316 to determine its location in addition to using the wireless signals, as described above.

Figure 5:
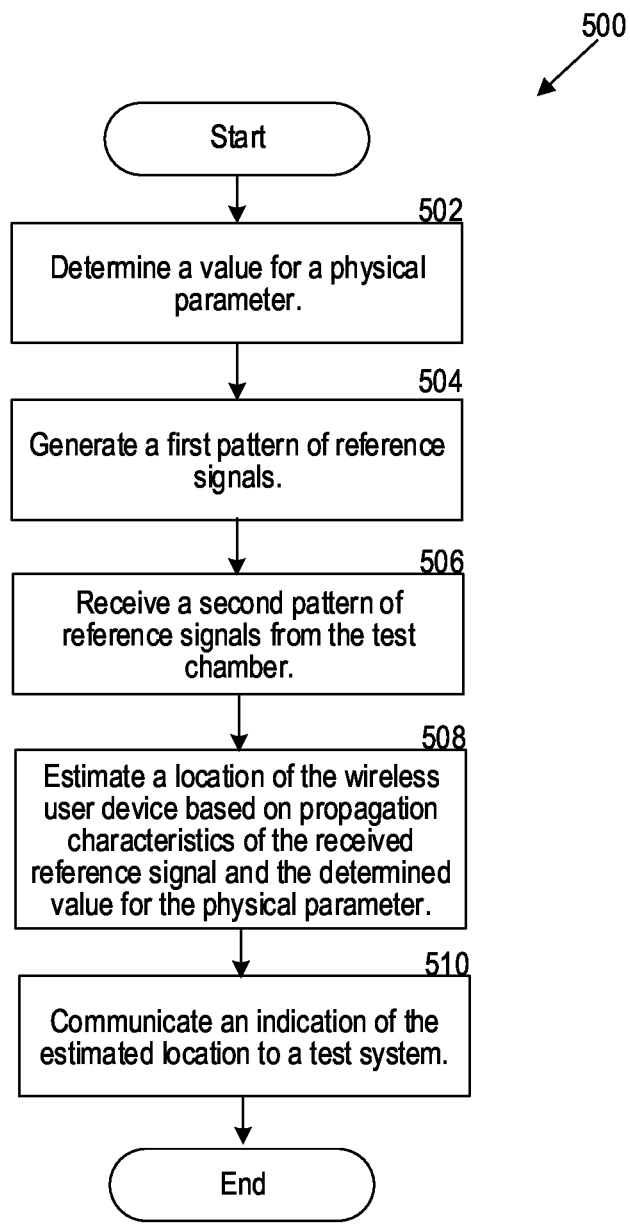
FIG. 5 is a flowchart that illustrates processes for determining a location of a wireless user device inside a test chamber.
Figure 6:
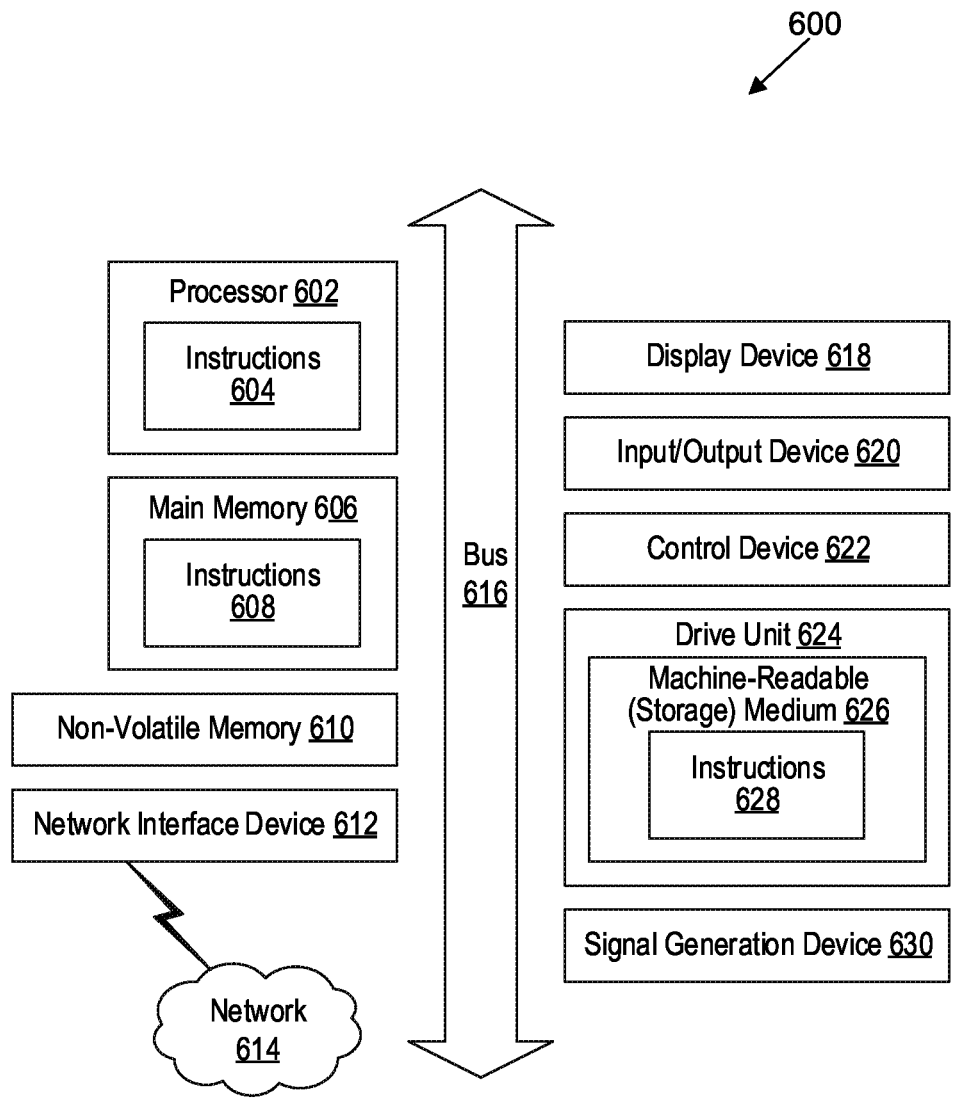
FIG. 6 is a block diagram that illustrates an example of a computer system in which at least some operations described herein can be implemented.

In some implementations, the system 300 further includes or is in communication with a computer system (e.g., a computer system described with respect to FIG. 6). The computer system is configured to include memory for storing instructions that may be executed by a processor. The instructions cause the system 300 to perform processes, including the processes described below with respect to flowcharts of FIGS. 4 and 5.

Figure 3B:
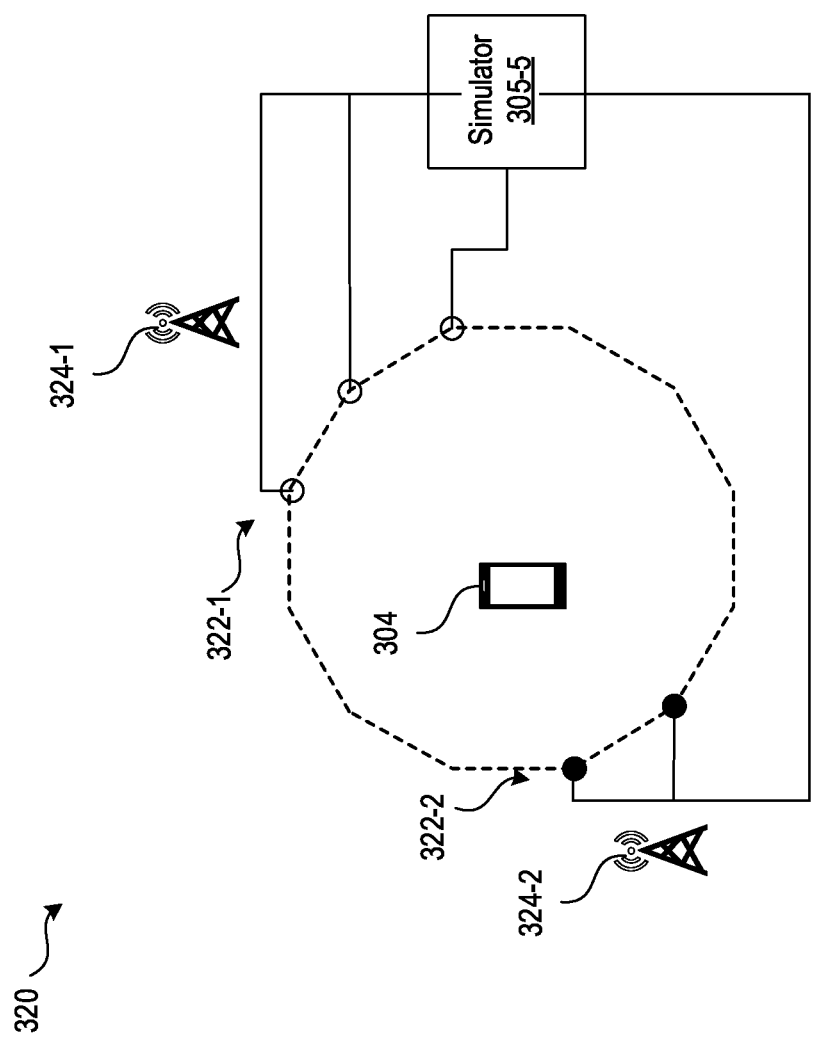
FIG. 3B is a block diagram that illustrates a phased antenna array system in which at least some aspects of the disclosed technology are incorporated.

FIG. 3B is a block diagram that illustrates a phased antenna array system 320 by which at least some aspects of the disclosed technology are incorporated. The phased antenna array system 320 may be used in combination with, or be part of, the system 300 described with respect to FIG. 3A. The phased antenna array system 320 includes a signal generator 305-5 corresponding to the signal generators 305. The signal generator 305-5 is coupled with one or more phased antenna arrays (e.g., arrays 322-1 and 322-2) each including multiple antennas configured to provide signals to the wireless device 304 (e.g., disposed inside the test chamber 302 as shown in FIG. 3A). The arrays 322-1 and 322-2 can include antennas arranged in two-dimensional or three-dimensional arrays. In the phased antenna array system 320, the array 322-1 is configured to simulate signals generated by a beacon 324-1 and the array 322-2 is configured to simulate signals generated by a beacon 324-2. As shown, the beacons 324-1 and 324-2 have different locations and distances relative to the wireless device 304. The arrays 322-1 and 322-2 can transmit signals from a variety of specific direction relative to the wireless device 304 with specific frequency shifts, strengths, and flight time latencies. For example, the array 322-1 transmits signals from three antennas (illustrated as patterned circles) and the array 322-2 transmits signals from two antennas (illustrated as solid circles). Furthermore, the arrays 322-1 and 322-2 may transmit signals with phases to simulate signals received by a moving object. For example, the three antennas of the array 322-1 may generate signals with appropriately shifted phases that mimic an instance where the wireless device 304 is receiving stationary signals while moving with a particular velocity and in a particular direction.

Figure 4:
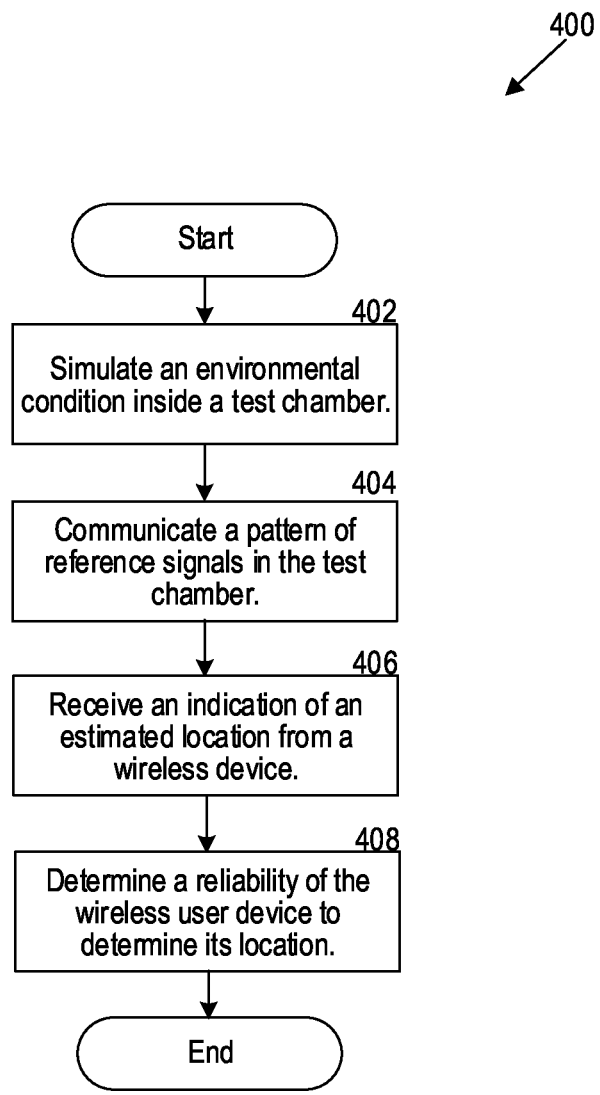
FIG. 4 is a flowchart that illustrates processes for determining a reliability of a wireless user device to determine its location under a simulated environmental condition.

FIG. 4 is a flowchart that illustrates processes 400 for determining the ability of a wireless device to reliably estimate its location under a simulated environmental condition. The processes 400 can be performed by a testing system including a test chamber and a computer system. For example, the processes 400 can be performed by the testing system 300 including the test chamber 302 described with respect to FIG. 3A and at the computer system 600 described below with respect FIG. 6.

At 402, the testing system (e.g., the system 300) can simulate an environmental condition inside a test chamber (e.g., the test chamber 302). The simulation can be performed by controlling a physical parameter inside the test chamber. The physical parameter can include one or more of a magnetic field, temperature, atmospheric pressure, light, sound, motion, or visualization. The system controls the physical condition with control elements 314 including the magnetic element 314-1, the temperature element 314-2, the atmospheric pressure element 314-3, the light element 314-4, the sound element 314-5, the visualization element 314-6, and the motion element 314-7, described above with respect to FIG. 2. In some implementations, the system controls two or more of the physical parameters. In some implementations, the system controls two or more physical parameters selected from the magnetic field, temperature, atmospheric pressure, light, sound, motion, and visualization.

A wireless device (e.g., the wireless device 304) can be disposed inside the test chamber. In some implementations, the wireless device is a mobile phone, a laptop computer, a tablet computer, or other similar devices (e.g., any of the wireless devices 104-1 through 104-7 described with respect to FIG. 1). In some implementation, the wireless device is a location finder unit of a vehicle such as a car, train, bus, or a plane. The wireless device is configured to receive signals (e.g., reference signals). For example, the wireless device includes a receiver configured to detect GPS, Wi-Fi, RF, or cellular signals. The wireless device is configured to estimate its location based on reference signals received from one or more signal sources. Alternatively, the wireless device is a test probe that is configured to receive signals (e.g., the test probe includes a receiver similar to that of a wireless device). The test probe can communicate information about the received signals (e.g., the propagation characteristics of the signals) to the testing system or to the computer device coupled to the testing system. The testing system can estimate the location of the test probe based on the signals received from the one or more signal sources by the test probe.

At 404, the system communicates a pattern of reference signals in the test chamber while the environmental condition inside the test chamber is being simulated. In some implementations, the device has set specific values or depictions for one or more of the magnetic field, temperature, atmospheric pressure, light, sound, motion, or visualization inside the test chamber and communicates the pattern of reference signals while maintaining the specific values or depictions. The pattern of reference signals is controlled by a signal generator (e.g., the signal generators 305 including RF path simulators) coupled with the test chamber. The signal generator is configured to vary one or more signal propagation characteristics of the pattern of reference signals to simulate an environment for the wireless device. The signal generator may be an RF signal generator. The one or more signal propagation characteristics may be associated with GPS signals, Wi-Fi signals, cellular signals, and RF signals. In some implementations, the communicated pattern of reference signals includes a combination of signals having two or more signal propagation characteristics of GPS signals, Wi-Fi signals, cellular signals, and RF signals.

At 406, the system receives an indication of an estimated location calculated by the wireless device based on the pattern of reference signals. The estimated location calculated by the wireless device may include an estimated location in a horizontal direction (e.g., a distance from a ground level) and an estimated location in a vertical direction (e.g., in accordance with a global or local coordinate system).

In some implementations, the simulated environmental condition corresponds to an indoor environmental condition. The one or more signal propagation characteristics of the pattern of reference signals can be associated with Wi-Fi signals. The pattern of reference signals in the test chamber can include a first reference signal from a first reference position and a second reference signal from a second reference position. The estimated location of the wireless device can be based on signal strength levels or a signal propagation of the first reference signal from the first reference position and the second reference signal from the second reference position.

In some implementations, the one or more signal propagation characteristics of the pattern of reference signals are associated with GPS signals. The pattern of reference signals in the test chamber may include a first reference signal from a first reference position, a second reference signal from a second reference position, and a third reference signal from a third position. The estimated location of the wireless device may be based on signal strength levels or a signal propagation of the first reference signal from the first reference position, the second reference signal from the second reference position, and the third reference signal from the third reference position.

In some implementations, the one or more signal propagation characteristics of the pattern of reference signals are associated with cellular signals. The pattern of reference signals in the test chamber may include a first reference signal from a first reference position, a second reference signal from a second reference position, and a third reference signal from a third position. The estimated location of the wireless device can be based on signal strength levels or a signal propagation of the first reference signal from the first reference position, the second reference signal from the second reference position, and the third reference signal from the third reference position.

At 408, the testing system determines a reliability of the wireless device to estimate a location of the wireless device under the simulated environmental condition. The reliability is determined based on a comparison of the estimated location with the simulated location. For example, the reliability may include that the estimated location was less than 1 meter, less than 2 meters, less than 5 meters, less than 10 meters, less than 25, etc., away from the simulated location. The testing system can determine whether the estimated location calculated by the wireless device based on the pattern of reference signals is within a predetermined threshold value from the simulated location. The predetermined threshold value may correspond to a threshold defined by a government agency or a threshold defined by a manufacturer of the wireless device.

In some implementations, the physical parameter corresponds to the atmospheric pressure. The received indication of the estimated location calculated by the wireless device is further based on a measured atmospheric pressure inside the test chamber. In some implementations, the estimated location is of an indoor environment. The atmospheric pressure may be used to determine that the device is inside a building based on a difference in the atmospheric pressure in indoor and outdoor environments.

In some implementations, the physical parameter corresponds to the visualization. The visualization can include an image depicting a simulated environment surrounding the wireless device. The received indication of the estimated location calculated by the wireless device is further based on the image depicting the simulated environment. The received indication includes a determination of whether the simulated environment is an indoor environment or an outdoor environment based on the image.

In some implementations, the physical parameter corresponds to the visualization. The visualization may include a video depicting a simulated environment surrounding the wireless device. The received indication of the estimated location calculated by the wireless device may further be based on the video. The received indication includes a determination of whether the wireless device is simulated to move in the simulated environment based on the video.

In some implementations, the physical parameter corresponds to a motion parameter. The motion includes a simulated velocity and direction for the wireless device. The received indication of the estimated location calculated by the wireless device may further include an estimated velocity and direction for the wireless device under the simulated environment. The testing system may further determine a reliability of the wireless device to determine a velocity and direction of the wireless device moving under the simulated environmental condition.

FIG. 5 is a flowchart that illustrates processes 500 for estimating a location of a wireless device inside a test chamber. The processes 500 can be performed by a wireless device such as a computer system. For example, the processes 500 can be performed by the testing system 300 including the test chamber 302 described with respect to FIG. 3A and at the computer system 600 described below with respect to FIG. 6.

At 502, the wireless device (e.g., wireless device 304) determines a value for a physical parameter. The determination is done while the wireless device is disposed inside a test chamber (e.g., the test chamber 302). The determination is done by one or more sensors or detectors of the wireless device. The one or more sensors or detectors are selected from, for example, a magnetometer, a thermometer, a sound detector, a light sensor, an atmospheric pressure sensor, a gyroscope, an accelerometer, or a camera. The physical parameter includes a magnetic field, temperature, atmospheric pressure, light, sound, motion, or visualization.

The test chamber has a controlled environment. For example, the test chamber is insulated from the surrounding physical environment including physical parameters and wireless signals in that environment. The test chamber is configured to simulate an environmental condition inside the test chamber by controlling the physical parameter.

The wireless device can be a mobile device (e.g., a mobile phone, a tablet computer, or a laptop computer). In some implementations, the wireless device is any of the wireless devices 104-1 through 104-7 described with respect to FIG. 1. In some implementations, the wireless device is a location tracker unit of a vehicle.

At 504, the wireless device actively generates a first pattern of reference signals (e.g., signals 318-1). The first pattern of reference signals may be a pattern of optical signals, radio signals, or sound signals. For example, the pattern of reference signals may include light detection and ranging (LIDAR) signals. The test chamber is configured to receive and absorb the first pattern of reference signals. The test chamber is also configured to measure characteristics of the first pattern of reference signals (e.g., signal power, directions, and propagation properties of the first pattern of reference signals). Subsequently, the test chamber is configured to generate a second pattern of reference signals (e.g., signals 318-2) having varying signal propagation characteristics that simulate reflections of the first pattern of reference signals off of various objects. The varying signals propagation characteristics simulate, for example, time-of-flight or signal power loss of a reflection of the first pattern of reference signals off objects that are situated beyond walls of the testing chamber. The second pattern of reference signals thereby mimics the first pattern of reference signals that would be reflected off of objects (e.g., wall of a room) in a real-world environment. At 506, the wireless device receives the second pattern of reference signals from the test chamber.

At 508, the wireless device estimates a location of the wireless device based on propagation characteristics of the received second pattern of reference signals and the value for the physical parameter. The estimated location may include coordinates in a global or local coordinate system. The estimated location can further include a vertical distance from the ground level.

At 510, the wireless device communicates an indication of the estimated location to a testing system coupled with the test chamber (e.g., the testing system 300 in FIG. 3A including the test chamber 302). The indication of the estimated location causes the testing system to determine a reliability of the wireless device to estimate its location under the simulated environmental condition.

Computer System

FIG. 6 is a block diagram that illustrates an example of a computer system 600 in which at least some operations described herein can be implemented. As shown, the computer system 600 can include one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-readable storage medium, excluding transitory signals and carrying instructions, which, when executed by at least one data processor of a testing system, cause the testing system to:
   simulate an environmental condition inside a test chamber by controlling a physical parameter including a magnetic field, temperature, atmospheric pressure, light, sound, motion, or visualization,
      wherein the test chamber has a controlled environment,
      wherein a wireless user device is disposed in the test chamber, and
      wherein the wireless user device is configured to estimate a location of the wireless user device based on one or more reference signals received from one or more signal sources;
   while the environmental condition inside the test chamber is being simulated, communicate a pattern of reference signals in the test chamber, wherein the pattern of reference signals is controlled by a signal generator coupled with the test chamber and configured to vary one or more signal propagation characteristics for a simulated location of the wireless user device;

receive an indication of an estimated location calculated by the wireless user device based on the pattern of reference signals; and determine, based on a comparison of the estimated location with the simulated location, a reliability of the wireless user device to estimate a location of the wireless user device under the simulated environmental condition wherein determining the reliability comprises determining whether the estimated location is within a predetermined threshold value from the simulated location.

2. The computer-readable storage medium of claim 1, wherein the estimated location calculated by the wireless user device includes an estimated location in a horizontal direction and an estimated location in a vertical direction.

3. The computer-readable storage medium of claim 1, wherein the physical parameter corresponds to the atmospheric pressure, and the received indication of the estimated location calculated by the wireless user device is further based on a measured atmospheric pressure inside the test chamber.

4. The computer-readable storage medium of claim 1, wherein:
the physical parameter corresponds to the visualization, the visualization including an image depicting a simulated environment surrounding the wireless user device,
the received indication of the estimated location calculated by the wireless user device is further based on the image depicting the simulated environment, and
the received indication includes a determination of whether the simulated environment is an indoor environment or an outdoor environment based on the image.

5. The computer-readable storage medium of claim 1, wherein:
the physical parameter corresponds to the visualization, the visualization including a video depicting a simulated environment surrounding the wireless user device;
the received indication of the estimated location calculated by the wireless user device is further based on the video; and
the received indication includes a determination of whether the wireless user device is simulated to move in the simulated environment based on the video.

6. The computer-readable storage medium of claim 1, wherein:
the physical parameter corresponds to the motion, the motion indicating a simulated velocity and direction for the wireless user device,
the received indication of the estimated location calculated by the wireless user device further includes an estimated velocity and direction for the wireless user device under the simulated environmental condition, and
the testing system is further caused to determine a reliability of the wireless user device to determine a velocity and direction of the wireless user device moving under the simulated environmental condition.

7. The computer-readable storage medium of claim 1, wherein the signal generator is a radio frequency (RF) signal generator and the one or more signal propagation characteristics are associated with GPS Positioning System (GPS) signals, Wireless Fidelity (Wi-Fi) signals, cellular signals, and RF signals.

8. The computer-readable storage medium of claim 1, wherein:
the simulated environmental condition corresponds to an indoor environmental condition;
the one or more signal propagation characteristics of the pattern of reference signals are associated with Wi-Fi signals;
the pattern of reference signals in the test chamber includes a first reference signal from a first reference position and a second reference signal from a second reference position; and
the estimated location of the wireless user device is based on signal strength levels or a signal propagation of the first reference signal from the first reference position and the second reference signal from the second reference position.

9. The computer-readable storage medium of claim 1, wherein:
the simulated environmental condition corresponds to an outdoor environmental condition;
the one or more signal propagation characteristics of the pattern of reference signals are associated with GPS signals;
the pattern of reference signals in the test chamber includes a first reference signal from a first reference position, a second reference signal from a second reference position, and a third reference signal from a third position; and
the estimated location of the wireless user device is based on signal strength levels or a signal propagation of the first reference signal from the first reference position, the second reference signal from the second reference position, and the third reference signal from the third reference position.

10. The computer-readable storage medium of claim 1, wherein:
the one or more signal propagation characteristics of the pattern of reference signals are associated with cellular signals;
the pattern of reference signals in the test chamber includes a first reference signal from a first reference position, a second reference signal from a second reference position, and a third reference signal from a third position; and
the estimated location of the wireless user device is based on signal strength levels or a signal propagation of the first reference signal from the first reference position, the second reference signal from the second reference position, and the third reference signal from the third reference position.

11. The computer-readable storage medium of claim 1, wherein:
the environmental condition inside the test chamber is simulated by controlling two or more physical parameters selected from the magnetic field, temperature, atmospheric pressure, light, sound, motion, and visualization; and
the one or more signal propagation characteristics of the pattern of reference signals are associated with two or more of GPS signals, Wi-Fi signals, cellular signals, and RF signals.

12. A testing system for a test probe, the testing system comprising:
a test chamber;
control elements coupled with the test chamber for simulating an environmental condition inside the test chamber, the control elements simulating a physical parameter selected from a magnetic field, temperature, atmospheric pressure, light, sound, motion and visualization,
wherein the test chamber has a controlled environment, and
wherein the test probe is disposed in the test chamber; and
a signal generator coupled with the test chamber,
wherein the signal generator is configured to:
control communication of a pattern of reference signals propagated in the test chamber while the environmental condition inside the test chamber is being simulated, and
vary one or more signal propagation characteristics for a simulated location of the test probe, and
wherein the testing system is configured to determine a capability of the test probe to reliably estimate a location of the test probe under the simulated environmental condition based on the pattern of reference signals,
wherein determining the capability of the test probe to reliably estimate the location of the test probe comprises determining whether the estimated location is within a predetermined threshold value from the simulated location of the test probe.

13. The testing system of claim 12, wherein:
the control elements include an atmospheric pressure controller configured to control the physical parameter corresponding to the atmospheric pressure; and
wherein the location of the test probe under the simulated environmental condition is determined further based on a measured atmospheric pressure inside the test chamber.

14. The testing system of claim 12, wherein:
the physical parameter corresponds to the visualization, the visualization including an image depicting a simulated environment surrounding the test probe; and
wherein the testing system is for determining the reliability of the test probe to determine the location of the test probe under the simulated environmental condition based further on the image.

15. The testing system of claim 12, wherein the signal generator is a radio frequency (RF) signal generator and the one or more signal propagation characteristics are associated with GPS Positioning System (GPS) signals, Wireless Fidelity (Wi-Fi) signals, cellular signals, and RF signals.

16. A computer-readable storage medium, excluding transitory signals and carrying instructions, which, when executed by at least one data processor of a wireless user device positioned inside a test chamber, cause the wireless user device to:
determine with a sensor of the wireless user device, while the wireless user device is positioned inside the test chamber, a value for a physical parameter including magnetic field, temperature, atmospheric pressure, light, sound, motion, or visualization,
wherein the test chamber has a controlled environment, and
wherein the test chamber is configured to simulate an environmental condition inside the test chamber by controlling the physical parameter;
while the environmental condition inside the test chamber is being simulated, generate a first pattern of reference signals;
receive, from the test chamber, a second pattern of reference signals,
wherein the second pattern of reference signals have varying signal propagation characteristics configured to simulate reflections of the first pattern of reference signals off of various objects; and
estimate a location of the wireless user device based on propagation characteristics of the received second pattern of reference signals and the value for the physical parameter;
communicate an indication of the estimated location to a testing system coupled with the test chamber,
wherein the indication of the estimated location causes the testing system to determine a reliability of the wireless user device to estimate the location of the wireless user device under the simulated environmental condition.

17. The computer-readable storage medium of claim 16, wherein the first pattern of reference signals is a pattern of optical signals, radio signals, or sound signals.

18. The computer-readable storage medium of claim 16, wherein the wireless user device corresponds to a location finder unit of a vehicle.

19. The computer-readable storage medium of claim 16, wherein the wireless user device corresponds to a mobile device.

* * * * *